Oct. 30, 1923.

E. R. BURTNETT 1,472,549

INTERNAL COMBUSTION ENGINE

Filed Jan. 12, 1922  3 Sheets-Sheet 2

Inventor:
E. R. Burtnett
By Hazard & Miller
Attorneys

Oct. 30, 1923.

E. R. BURTNETT 1,472,549

INTERNAL COMBUSTION ENGINE

Filed Jan. 12, 1922  3 Sheets-Sheet 3

Inventor
E. R. Burtnett
By Hazard & Miller
Attorneys

Patented Oct. 30, 1923.

1,472,549

UNITED STATES PATENT OFFICE.

EVERETT R. BURTNETT, OF LOS ANGELES, CALIFORNIA, ASSIGNOR OF ONE-HALF TO CHARLES A. BURTNETT, OF LOS ANGELES, CALIFORNIA.

INTERNAL-COMBUSTION ENGINE.

Application filed January 12, 1922. Serial No. 528,639.

*To all whom it may concern:*

Be it known that I, EVERETT R. BURTNETT, a citizen of the United States, residing at Los Angeles, in the county of Los Angeles and State of California, have invented new and useful Improvements in Internal-Combustion Engines, of which the following is a specification.

My invention relates to a two-cycle internal combustion engine, the principal objects of my invention being to generally improve upon and simplify the construction of the existing forms of similar engines; to provide a two-cycle engine with a sleeve valve for controlling the inlet of gaseous fuel to the combustion chamber and the exhaust of the burnt products of combustion from said chamber; to provide a construction wherein the sleeve valve is formed with an annular head that cooperates with other parts of the engine in precompressing the charge of gaseous fuel prior to its entrance into the combustion chamber; to provide an engine of the character referred to that comprises relatively few parts that may be readily assembled or taken apart; to construct the engine cylinder, sleeve valve and piston so that the bearing faces thereof may be readily machined; to provide a construction that will be highly effective in bringing about a complete discharge of all products of combustion after each explosion within the combustion chamber; to provide for the effective lubrication of the external surface of the sleeve valve; and, further, to utilize the relatively cool temperature of the fuel gases entering the combustion chamber for exerting a cooling effect upon the piston.

With the foregoing and other objects in view, my invention consists in the features of construction and combination and arrangement of parts hereinafter more fully described and claimed, reference being had to the accompanying drawings, wherein:

Figure 1:
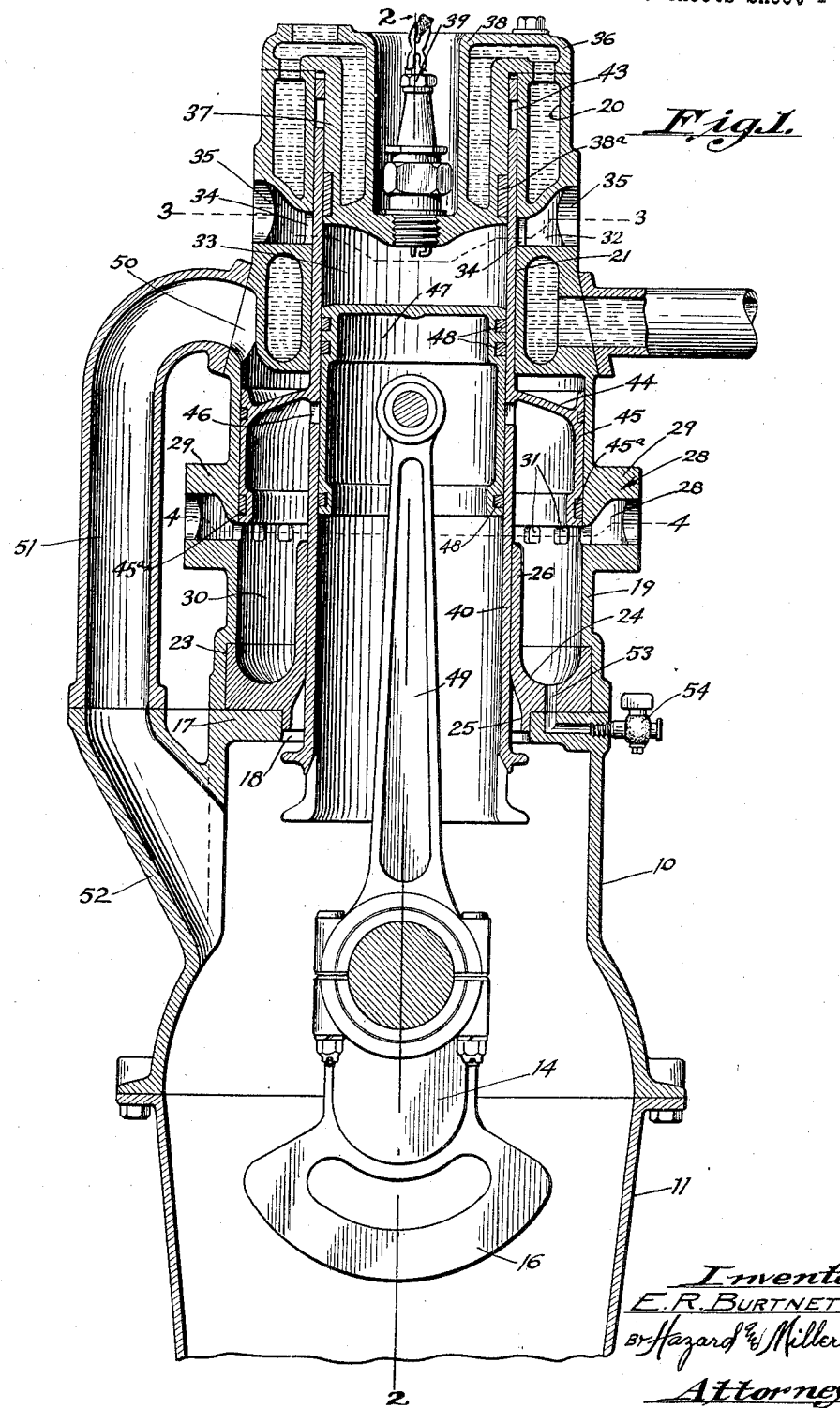
Figure 1 is a vertical transverse section taken through the center of an internal combustion engine of my improved construction.

Referring by numerals to the accompanying drawings, which illustrate a practical embodiment of my invention, 10 designates the upper part and 11 the lower part of the crank case, which parts are preferably cast from suitable metal and formed with suitable bearings 12 for a shaft 13 having a piston crank 14 and a valve crank 15, said piston crank having a relatively longer throw than said valve crank.

In the accompanying drawings, I have shown the axes of the cranks 14 and 15 occupying the same radial plane with the axis of shaft 13, but this arrangement may be varied as desired, and by arranging the crank 15 a few degrees on either side of the radial plane occupied by the axes of the shaft 13 and crank 14, the desired lead or lag may be provided for the sleeve valve that is actuated by crank 15. The arm that is arranged between the cranks 14 and 15 is preferably provided with a counterbalancing weight 16 that is positioned diametrically opposite to said cranks.

The upper member 10 of the crank case is provided with a horizontally disposed top plate 17, in which is formed a circular opening 18.

Positioned on plate 17 and rigidly fixed thereto in any suitable manner is the base portion of a casting that constitutes the cylinder 19 of the engine, the bore of said cylinder having three different internal diameters. The upper portion of the cylinder which is provided with double walls to form a chamber 20 that receives a circulating cooling medium is formed with a bore or chamber 21 of the least diameter and the greater portion of the lower half of the cylinder is provided with a bore or chamber 22 of larger diameter. The bore or chamber 23 of greatest diameter is formed at the extreme lower end of the cylinder and said bore of greatest diameter is relatively short.

Positioned on top of plate 17 is a ring 24, the outer portion of which fits snugly in the bore or chamber 23 of greatest diameter and formed integral with the inner edge of this ring 24 is a depending flange 25 that fits snugly within the opening 18 in said plate 17. Formed integral with and projecting upwardly from the inner edge of ring 24 is a relatively short vertically disposed sleeve 26 that serves as a support and guide for the lower portion of the sleeve valve of my improved engine. Formed integral with the wall of the cylinder 19 and preferably at a medial point on the height of the bore or chamber 22 is an annular housing 27 that encloses a fuel inlet chamber 28, said housing being provided at two or more points with nipples 29 to which may be connected gaseous fuel supply pipes (not shown) formed through the wall of cylinder 19 and establishing communication between the annular chamber 28 and the chamber 30. Between the lower portion of the outer wall of the cylinder 19 and the sleeve 26, which constitutes a precompression chamber, is a series of gaseous fuel inlet ports 31.

Formed in the upper portion of cylinder 19 or that portion which surrounds the bore or chamber 21 of least diameter is an annular exhaust chamber 32 and formed through the inner portion of the cylinder wall and establishing communication between the combustion chamber 33 and said exhaust chamber 32 is a series of exhaust ports 34. The exhaust chamber 32 may be provided with two or more outlets 35 and if desired exhaust pipes (not shown) may be connected to said ports 35.

Secured in any suitable manner to the upper end of the cylinder 19 is a head 36 that is provided with a cooling medium chamber that communicates with the chamber 20 in cylinder 19 and a cylindrical portion 37 of said head extends downwardly into the combustion chamber 33, the external diameter of which cylindrical portion is slightly less than the diameter of said combustion chamber. Such construction provides a relatively narrow annular space between the cylindrical portion 38 of the head and the upper portion of the sleeve valve of the engine. Seated in the center of the head 38 is a spark plug 39 of ordinary construction, the terminals of which plug are positioned in the upper portion of the combustion chamber 33. Seated in the lower portion of the periphery of the cylindrical member 38 are one or more packing rings, such as 38ª.

The sleeve valve of my improved engine includes an elongated tubular member 40, the internal and external diameters of which are uniform throughout its length, and the upper portion of said sleeve valve fits snugly within the bore 21 of least diameter and extends upwardly around the cylindrical portion 38 of head 36. The lower portion of the sleeve valve is arranged for sliding movement through sleeve 26 that projects upwardly from ring 24, and pivotally connected to a wrist pin 41 that projects laterally from the lower portion of said sleeve valve is the upper end of a rod 42, the lower end of which is journaled on the relatively short crank 15. Formed through the upper portion of the wall of the sleeve valve is a series of ports 43 that are adapted when said sleeve valve is drawn downwardly through the cylinder to coincide with the ports 34, in order to permit the products of combustion and burnt gases to exhaust from the combustion chamber through the coinciding ports and into and through annular exhaust chamber 32. Formed integrally with or fixed to the sleeve valve 40 and preferably near its center is an outwardly projecting downwardly curved head 44 with the outer edge of which is formed integrally a vertically disposed annular wall 45, the outer face of which bears directly against the inner face of the wall of the cylinder that is disposed about the precompression chamber 30. Suitable packing rings 45ª are seated in the outer face of the annular wall 45 adjacent to its upper and lower ends formed through the wall of the tubular member that constitutes the body of the sleeve valve and immediately below the inner portion of head 44 is a circumferentially disposed row of ports 46 that constitute inlet ports for admitting a charge of gaseous fuel from the precompression chamber 30 into the combustion chamber 33.

Arranged for reciprocatory movement within the sleeve valve is a piston 47 in the periphery of which is seated two or more suitable packing rings 48, and connecting this piston and the crank 14 that is the longest throw is a suitable connecting rod 49. Formed through the wall of the cylinder 19 that surrounds the upper portion of precompression chamber 30 is an opening 50 and connected thereto is the upper end of a pipe 51, the lower end of which is connected to a tubular extension 52 that is formed integrally with and projects outwardly and upwardly from the upper member 10 of the crank case. The construction just described provides means whereby oil vapor may be drawn from the crank case upwardly into the upper portion of the precompression chamber 30, thereby providing ample lubrication for the upper portion of the external surface of the sleeve valve and for the inner surface of the wall of the cylinder surrounding the precompression chamber.

Leading downwardly through ring 24 and outwardly through plate 17 is a duct 53 that is for the purpose of permitting the discharge of any liquid lubricant that may collect on top of said ring 24, and seated in the plate 17 at the lower end of this duct is a suitable valve 54.

Figure 2:
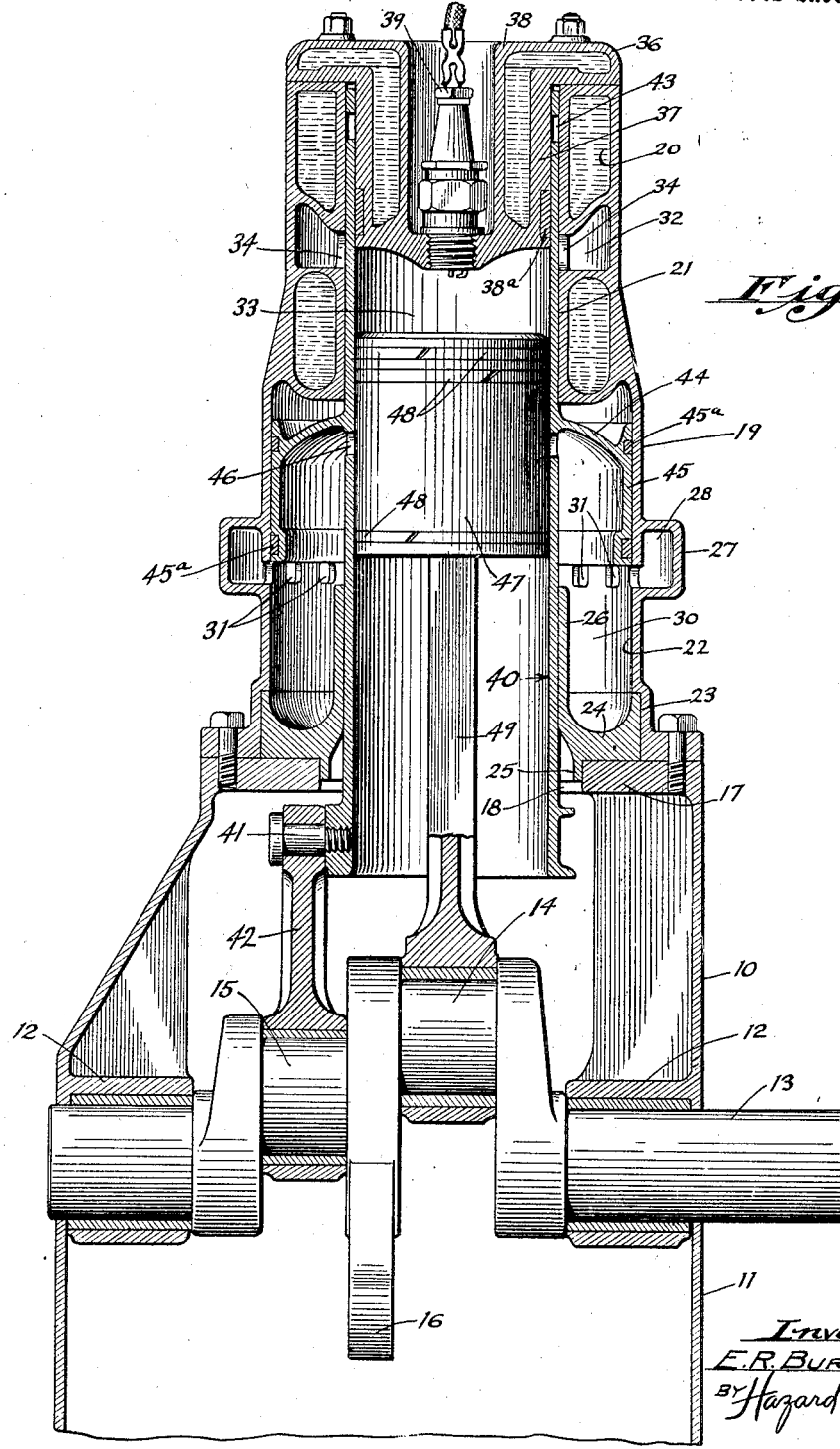
Figure 2 is a vertical longitudinal section taken approximately on the line 2—2 of Figure 1.
Figure 3:
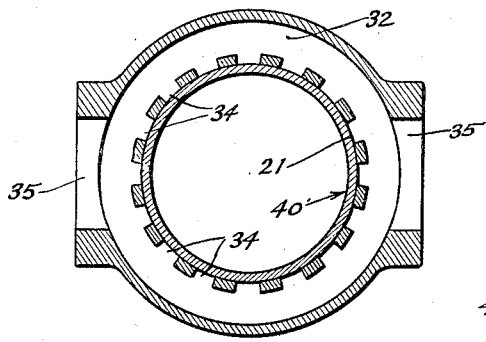
Figure 3 is a horizontal section taken on the line 3—3 of Figure 1.
Figure 5:
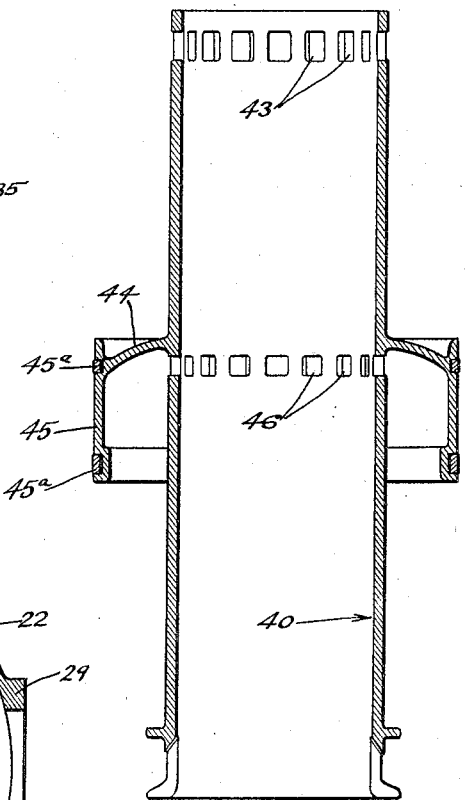
Figure 5 is a section taken lengthwise through the center of the piston sleeve valve.
Figure 4:
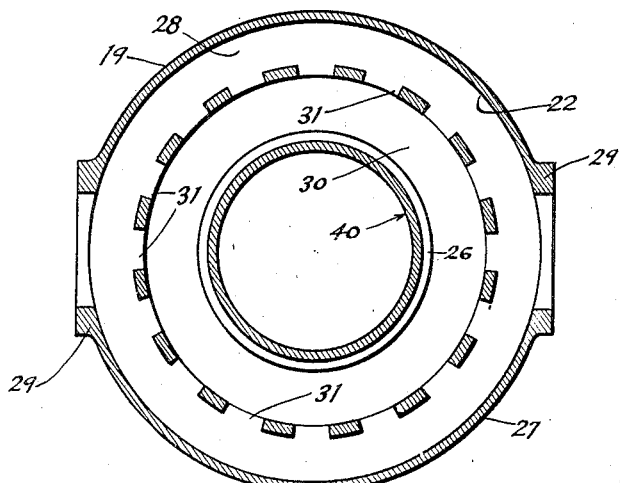
Figure 4 is a horizontal section taken on the line 4—4 of Figure 1.
Figure 6:
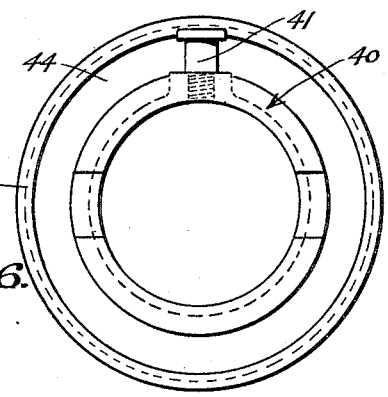
Figure 6 is a view looking against the under side of the piston sleeve valve.

The operation of my improved engine is as follows: With the parts of the engine occupying the positions illustrated in Figures 1 and 2, the piston 47 and sleeve valve 40 are at their high centers, and a charge of gaseous fuel previously admitted to the combustion chamber 33 is under high compression between the head of the piston and the under side of cylindrical portion 38 of head 36. Immediately after the piston starts on its downward movement or when crank 14 passes its high center, a spark is produced between the terminals of plug 39, thereby igniting the compressed charge of gaseous fuel, and as a result, the piston is moved downwardly through the sleeve 40 on its power stroke, and the motion and power thus produced is transmitted through rod 49 to crank shaft 13. Inasmuch as sleeve valve 40 is connected to the shorter crank 15 by connecting rod 42, the sleeve valve will move downwardly simultaneously with piston 47, but at a relatively slower speed, due to the difference of throw or travel between cranks 14 and 15.

The parts of the engine are constructed so that ports 43 begin to register with exhaust ports 34 shortly before piston 47 reaches its low center, and an instant later, or approximately ten degrees of travel of the crank shaft, the top of piston 47 passes below the upper edges of inlet ports 46, thereby admitting a precompressed charge of fuel from chamber 30 into the combustion chamber 33.

As soon as exhaust ports 43 begin to register with ports 34, the relatively high pressure prevailing within the combustion chamber will be relieved and the burnt gases and products of combustion will begin to discharge through the registering exhaust ports and this exhaust of the burnt gases will be accelerated by the precompressed charge of gaseous fuel that enters the combustion chamber an instant later through the uncovered inlet ports 46. This opening of the exhaust ports and subsequent opening of the inlet ports and the consequent exhaust of burnt products of combustion and the entrance of the charge of precompressed gaseous fuel into the combustion chamber takes place during the period of time that the piston 47 and sleeve valve are approaching low center and immediately after they have passed such low center and are beginning their upward movements. As the ports 43 move upwardly past ports 34, the further exhaust of burnt gases through the exhaust ports is cut off and immediately following this action the top of piston 47 passes above the upper ends of inlet ports 46, and during the continued upward movement of the piston 47 the charge of gaseous fuel will be compressed in the combustion chamber until at the point of highest compression or immediately thereafter the charge will be ignited by the spark produced between the terminals of the spark plug, as hereinbefore described. As the sleeve valve approaches its upper limit of movement, the lower edge of annular wall 45 passes above the inlet ports 31 with the result that a charge of combustible fuel is drawn into the precompression chamber 30, which action is accelerated, due to the suction produced by the upward movement of the head 43 and wall 45. The inlet ports 31 are uncovered during the final portion of the upward travel of the sleeve valve and necessarily they are closed during the first portion of the downward travel of said valve, and as a result the charge of gaseous fuel drawn into chamber 30 will be precompressed during the greater portion of the downward travel of the sleeve valve, and in such precompressed condition the charge will be admitted to the combustion chamber 33 when piston 47 passes below inlet ports 46. The inlet ports 46 are arranged in a circumferentially disposed row, and by virtue of such arrangement the relatively cool precompressed charge will discharge directly across the top of the piston 47 in entering the combustion chamber, and such action will be of material benefit in exerting a cooling effect on the piston and, consequently, counteracting the tendency of said piston to become overheated as a result of the high temperatures developed in the combustion chamber during the ignition of the charges drawn thereinto.

In operation, the sleeve 40 and piston 47 travel in the same direction but at different speeds on both strokes, and such action eliminates the friction and "drag" ordinarily developed where a piston and sleeve move in opposite directions. The ring 24 is very readily centered on the plate 17 by the flange 25 that enters the aperture 18 and as said ring fits snugly in the bore 23 of greatest diameter in the cylinder, the latter may be very easily centered upon said ring and upon the top of the crank case. The arrangement of the bores of different diameters within the cylinder enables the latter to be very readily machined and finished, and likewise enables the parts of the engine associated with the cylinder to be readily assembled or taken apart and, consequently, greatly facilitates repairs or renewal of parts.

The provision of the precompression chamber 30 in the engine cylinder eliminates the necessity for the crank case compression as ordinarily employed in two-cycle internal combustion engines, and the provision of the relatively long sleeve 26 affords ample bearing for the lower portion of the sleeve valve during its operation and at the same time gives ample surface to insure an effective oil seal between said sleeve valve and its lower bearing.

Various minor changes in the size, form

I claim as my invention:

1. In an internal combustion engine, a cylinder, an annular member arranged in the lower portion thereof, a centrally arranged bearing, a sleeve valve arranged for operation through said bearing, a piston arranged for operation within said sleeve valve, a crank shaft and connections between said piston and sleeve valve and crank shaft whereby said piston and sleeve valve move simultaneously in the same direction at different speeds, an annular head carried by said sleeve valve and operating in a chamber formed in the cylinder above the bearing ring positioned at the lower end of said cylinder for precompressing charges of gaseous fuel, and there being fuel inlet ports formed through the wall of the sleeve at points beneath the head and in close proximity to the junction of the head and sleeve valve, valve to permit charges of precompressed fuel to enter the combustion chamber, within the sleeve valve above the piston therein.

2. In an internal combustion engine, a cylinder, an annular member seated in the lower end thereof, a crank case to which the cylinder is connected, a sleeve valve carrying a piston head arranged for operation within said cylinder and pre-compression chamber, which sleeve valve passes through and bears upon the annular member in the lower end of said cylinder, said sleeve valve and cylinder being provided with inlet and exhaust ports that are adapted to coincide during the movement of the sleeve valve within the cylinder, a piston arranged for operation within the sleeve valve, a crank shaft journaled in bearings on the crank case, connections from said piston and sleeve valve to said crank shaft, and a duct leading from the crank case to the intermediate portion of the chamber within the cylinder.

3. In an internal combustion engine, a cylinder having a precompression chamber and a combustion chamber, a member seated in the lower end of the cylinder and closing the lower end of the precompression chamber, a centrally arranged bearing formed on said member, a sleeve valve arranged for operation through said bearing and extending into the combustion chamber of the engine, a head carried by said sleeve valve and arranged within the precompression chamber, there being fuel inlet ports formed through the wall of the cylinder surrounding the precompression chamber, there being inlet ports formed through the wall of the sleeve valve immediately beneath the head carried thereby, there being exhaust ports formed through the wall of the cylinder and leading from the upper portion of the combustion chamber therein and there being exhaust ports formed through the upper portion of the sleeve valve and adapted to coincide with the exhaust ports in the wall of the cylinder.

4. In an internal combustion engine, a cylinder having a precompression chamber and a combustion chamber, a member seated in the lower end of the cylinder and closing the lower end of the precompression chamber, a centrally arranged bearing formed on said member, a sleeve valve arranged for operation through said bearing and extending into the combustion chamber of the engine, a head carried by said sleeve valve and arranged within the precompression chamber, there being fuel inlet ports formed through the wall of the cylinder surrounding the precompression chamber, there being inlet ports formed through the wall of the sleeve valve immediately beneath the head carried thereby, there being exhaust ports formed through the wall of the cylinder and leading from the upper portion of the combustion chamber therein, there being exhaust ports formed through the upper portion of the sleeve valve and adapted to coincide with the exhaust ports in the wall of the cylinder, a crank case on which the cylinder is mounted, a crank shaft journaled in said crank case, a piston arranged for operation within the sleeve valve, and connections from the crank shaft to said piston and sleeve valve.

5. In an internal combustion engine, a cylinder having a precompression chamber and a combustion chamber, a member seated in the lower end of the cylinder and closing the lower end of the precompression chamber, a centrally arranged bearing formed on said member, a sleeve valve arranged for operation through said bearing and extending into the combustion chamber of the engine, a head carried by said sleeve valve and arranged within the precompression chamber, there being fuel inlet ports formed through the wall of the cylinder surrounding the precompression chamber, there being inlet ports formed through the wall of the sleeve valve immediately beneath the head carried thereby, there being exhaust ports formed through the wall of the cylinder and leading from the upper portion of the combustion chamber therein, there being exhaust ports formed through the upper portion of the sleeve valve and adapted to coincide with the exhaust ports in the wall of the cylinder, a crank case on which the cylinder is mounted, a crank shaft journaled in said crank case, a piston arranged for operation within the sleeve valve, connections form the crank shaft to said piston and sleeve valve, and a duct leading from the crank case to the upper portion of the precompression chamber.

6. In an internal combustion engine, a cylinder, an annular member seated in the lower end thereof, a crank case to which the cylinder is connected, a sleeve valve carrying a piston head arranged for operation within said cylinder and pre-compression chamber, which sleeve valve passes through and bears upon the annular member in the lower end of said cylinder, said sleeve valve and cylinder being provided with inlet and exhaust ports that are adapted to coincide during the movement of the sleeve valve within the cylinder, a piston arranged for operation within the sleeve valve, a crank shaft journaled in bearings on the crank case, and connections from said piston and sleeve valve to said crank shaft.

In testimony wherof I have signed my name to this specification:

EVERETT R. BURTNETT.